(12) United States Patent
Freger et al.

(10) Patent No.: US 7,103,500 B2
(45) Date of Patent: Sep. 5, 2006

(54) APPARATUS AND METHOD FOR DISTANCE MEASUREMENT WITH CONTROLLED MODULATION OF EMITTED PULSES

(75) Inventors: David I Freger, Ashkelon (IL); Alexander M Raykhman, East Greenwich, RI (US)

(73) Assignees: InESA, Inc., East Greenwich, RI (US); Alexander M. Raykhman, East Greenwich, RI (US)

( * ) Notice: Subject to any disclaimer, the term of this patent is extended or adjusted under 35 U.S.C. 154(b) by 0 days.

(21) Appl. No.: 10/776,763

(22) Filed: Feb. 11, 2004

(65) Prior Publication Data

US 2004/0181359 A1  Sep. 16, 2004

Related U.S. Application Data

(60) Provisional application No. 60/449,487, filed on Feb. 21, 2003.

(51) Int. Cl.
*G06F 15/00* (2006.01)

(52) U.S. Cl. ..................................... 702/158
(58) Field of Classification Search ............ 702/158, 702/136; 345/158, 467, 156; 347/10, 71; 320/510; 358/1; 66/75.2; 713/202; 714/704; 348/177; 202/158

See application file for complete search history.

(56) References Cited

U.S. PATENT DOCUMENTS

| | | | |
|---|---|---|---|
| 5,699,151 A | 12/1997 | Akasu | 356/5.01 |
| 5,793,704 A | 8/1998 | Freger | 367/95 |
| 5,822,275 A | 10/1998 | Michalski | 367/99 |
| 5,877,997 A | 3/1999 | Fell | 367/99 |
| 5,892,576 A | 4/1999 | Gaechter | 356/5.05 |
| 6,122,602 A | 9/2000 | Michalski et al. | 702/159 |
| 6,128,982 A | 10/2000 | Gwin, Sr. | 81/452 |
| 6,581,047 B1 | 6/2003 | Raykhman et al. | 706/21 |
| 6,738,044 B1 * | 5/2004 | Holzrichter et al. | 345/158 |

* cited by examiner

*Primary Examiner*—Michael Nghiem
*Assistant Examiner*—Tung S. Lau
(74) *Attorney, Agent, or Firm*—McCormick, Paulding & Huber LLP

(57) ABSTRACT

Pulse transit time-based method for distance measurement employs a complex multi-parametric modulation of emitted pulses with adaptive control of the parameters of modulation. An evaluation of the pulse transit time-variable's observability in a measuring cycle is used as an input of the adaptive control loop. The achieved special pattern of received pulses provides for obtaining a vector of characteristic elements on the pattern with low sensibility to active and passive disturbances present during measurement. These characteristic elements are used by the method for the accurate measurement of the pulse transit time, and consequently, for the calculation of the distance between the emitter of pulses and the target.

25 Claims, 9 Drawing Sheets

APPARATUS AND METHOD FOR DISTANCE MEASUREMENT WITH CONTROLLED MODULATION OF EMITTED PULSES

CROSS-REFERENCE TO RELATED APPLICATIONS

This application claims the benefit of and priority from U.S. Provisional Patent Application Ser. No. 60/449,487 filed 21 Feb. 2003, which is hereby incorporated by reference in its entirety.

BACKGROUND OF THE INVENTION

1. Field of the Invention

The invention relates to methods and apparatus for pulse transit time-based distance measurement 2. Description of the Related Art A pulse transit time-based approach is typical among the methods for distance measurement. In these methods, a variety of terms such as "transit pulse", "wave pulse, "wave train" or "pulse burst" define the same—a pulse or group of pulses transferable by an oscillating agent (a waveform) from the pulse generating device toward a target; said pulse burst then reflected at the target presumably back to the pulse generating device. Any pulse transit time-based method for distance measurement requires knowledge of the time elapsed between the transmission of the wave pulse and receiving the wave pulse reflected at the target: pulse transit time (PTT). The oscillating agent could be of a different physical origin including but not limited to electromagnetic waves, light or sound. Regardless of the type of energy involved, every pulse transit time method measures PTT for its further conversion into a sought distance and suffers from passive and active disturbances. The passive disturbances result from reflections produced at fixed targets that differ from the true target. The active disturbances are created either by spurious sources of the same physical nature the transmitted pulse burst is or caused by electromagnetic interference at inputs of the measuring system's electronic hardware.

The U.S. Pat. No. 5,877,997 may serve as an example of using ultrasound pulses for the pulse echo distance measurement. The method of this patent implements the sought distance determination by measuring the pulse transit time of the main (first) transmitted pulse train and including the derived pulse echoes into the analysis to provide self-diagnostic checks and eliminate spurious information that might be produced by the system's elements internal delays. A particular advantage of this method is that a very small distance between the sensor and the target becomes measurable if the medium where the ultrasound pulses propagate is a fluid with low acoustic signal decrement. In those cases where the loss of the acoustic energy is high, such as in the air medium, the derived echoes are very weak limiting the applicability of the method of measurement. In addition, the method of the discussed patent does not address the problem of protecting the distance measurement against the passive and active disturbances.

Another example of the acoustic pulse transit time method for distance measurement is described in the U.S. Pat. No. 5,793,704 where issues relating to the transit time accurate measurement are well defined. The patent discloses that low energy echo-signals and fluctuation in the velocity of sound might cause errors in the pulse transit time measurement. The PTT is measured through the obtaining and consequently analyzing the echo-envelope. According to the patent, the echo-envelope is formed by an emitted acoustic pulse burst of the constant amplitude, frequency and off-duty factor. For the PTT measurement, the patent recommends using the envelope's maximum value as a characteristic parameter of the echo-envelope. In addition, the patent suggests working at an upper threshold of the system's linearity that can be obtained through a calibration procedure, which is incorporated into each measuring cycle. Therefore, the time position of the echo-envelope's maximum becomes a critical parameter that defines the sought distance. In other cases, such a characteristic parameter might be a pulse's zero crossing or another local element of the echo-envelope that is observable through monitoring of the measuring system's signals; is stationary and uniquely defined by the system's rigid organization. The discussed example of the prior art uses a single variable that has the property of being highly sensitive to the moment of time the echo pulse burst returns to the sensor. However, this method does not distinguish between the true target reflection and other fixed target reflections and/or effect of active disturbances that might occur in the measuring cycle.

The U.S. Pat. Nos. 6,122,602 and 5,822,275 illustrate the utilization of electromagnetic wave trains in the pulse transit time method for distance measurement. Particularly, in the U.S. Pat. No. 5,822,275, a sampling procedure is applied for storing data describing echo-envelopes; the data are collected separately for the actual target and for a variety of other fixed targets that cause errors during the distance measurement. In the '275 patent, the emitted pulses of each measuring cycle are identical and follow at a given transmitting frequency. According to the patent disclosure, the implementation of the method of this invention requires prior to the measurement cycle, information related to the fixed target echos is acquired and stored for use for suppressing the fixed target echoes. Apparently, the above-described approach to the distance measurement requires a prior knowledge of the fixed targets disposition and is subject to error each time when a new unaccounted fixed target appears. This limits the method's applicability and reduces its operational speed. Furthermore, the discussed prior art method does not provide for the elimination of active disturbances from the process of distance measurement. However, the important idea of this method is the creation of the set of several characteristic values derived from the echo-envelope; this set is associated with each target and is used in a measuring cycle for suppressing echoes from the fixed targets whereby improving the accuracy of the PTT and the distance measurement. Also, it is important also to realize that the above-described set of characteristic values conforms to the unchangeable structure of the measuring device.

Application of the light pulses for distance measurement is described in the U.S. Pat. No. 5,699,151. The patent presents a device that measures distance based on the pulse transit time method. The device functions in the environment where the interference light exists and therefore, creates a disturbing addition to the incident light that comes to the device's light receiver. The patent describes the way of reducing harmful effect that the interference light causes to the accuracy of distance measurement. The principle of operation is explained in the patent disclosure as follows: ". . . when interference light exists in incident light, the interference light has the property that, as compared with the reflection light reflected by an object of measurement, the intensity is greater and a fluctuation in the intensity is small, and that incident light exists even after the distance measurement time equivalent to the distance measurable range in which time data is measured. In order to exclude the interference light from the process of measurement, the device of this patent, is equipped with an interference light detection means, "... determining whether interference light exists in the incident light, based on the intensity of the incident light". Because of such action, the invalid distance readings are excluded from the device's output. This device demonstrates the feasibility of the pulse transit time method with the light waveform agent. At the same time, according to the device's method of operation, the readings are protected from the occurrence of the interference light at the aperture of the light receiving element. Similar to other shown above prior art examples, this method uses at least one specific characteristic of the reflected pulses—the intensity of light measured at the opening of the light receiving unit. However, reflections from the fixed targets and light emissions from spurious sources together with fluctuation in the medium transparency might cause the device to yield an invalid data, or the opposite, to block the distance measurement during several measuring cycles. None of the discussed above methods and devices provide with an inclusive, oscillating agent-independent and effective solution to the elimination of the passive and active disturbances from the pulse transit time-based method for distance measurement.

Another measuring technique must be mentioned in the prior art section of the present invention. This technique suggests modulation of the transmitted pulses for increasing the signal-to-noise ratio during the distance measurement. The importance of the emitted pulses modulation is that such a technique aims directly against the possible disturbances of the measuring process. The U.S. Pat. Nos. 6,128,982 and 5,892,576 are indicative with respect to the transmitted pulses modulation in methods for distance measurement. The device of the U.S. Pat. No. 6,128,982 implements a two-step pulse transit time method where the first step is for the coarse determination of the PTT and respectively the sought distance; the second step is for the fine distance measurement through monitoring of the phase shift between the transmitted pulse burst and the returned echo-signal. During the first step of a measuring cycle, the emitted pulse of the electromagnetic wave is modulated by a pseudo-random digital code of finite length. Once received, the echo-signal is converted into a digital code for its further correlation analysis with the modulating pseudo-random code that was generated at the beginning of the measuring cycle. The purpose of the correlation analysis is a coarse determination of the pulse transit time. In general, the principle of the transmitted pulses modulation helps reduce the effect that active and/or passive disturbances might have upon the accuracy of the distance measurement. However, the pseudo-random code modulation might become harmful rather then beneficial with regards to the accuracy of distance measurement. The echo-envelope resulting from the above-mentioned type of modulation might obtain a shape similar to the one that occurs by virtue of the action of some passive and/or active disturbances. Then, the correlation between the pseudo-random code and the echo-envelope digital representation could be established at an incorrect instance of time leading to the incorrect calculation of PTT. In addition, due to the stochastic nature of the echo-envelope characteristic variable, which is the correlation function peak, the coarse PTT measurement mandates the second step of a measuring cycle: sending another pulse burst, receiving corresponding echo signal, and evaluating the phase difference between the echo signal and the delayed transmitted signal. The delayed transmitted signal is the transmitted pulse burst of the second step that was previously delayed by the value of the measured PTT of the first step. The process of the second step is not protected from the signal distortion that any passive and/or active disturbance might cause.

The method of the U.S. Pat. No. 5,892,576 uses modulation of transmitted pulses too. The oscillating agent of this method is a pulse burst of light provided by a laser and received as echoes by a receiver. According to the abstract of the patent, "(T)he pulses are each produced within respective intervals having a common predetermined duration. Each pulse is time-shifted relative to the beginning of its corresponding interval. A pulse pattern comprising echo signals for each of a series of pulses is used to determine the distance to an object producing the echoes". The analysis of the last two prior art patents leads to the understanding that every pulse-code method for distance measurement utilizes the idea of reducing the probability of erroneous capturing the incoming echo-signal due to the creation of a specific echo-pattern through the code-modulation of the emitted pulses. A calculation of probabilities in the simple example below demonstrates the efficiency of this prior art approach. The probability of the event that a single echo-pulse taken by a receiver is an error is denoted by p. Considering the possible method's embodiment where the only occurrence of the three consequent pulses is the "true" echo, reduces the probability ($p_1$) of receiving the "false" echo to the power of three, $p_1=p^3$, which is, for instance, 1000 times less then the probability p observed in conventional methods if given p=0.1. The authors of the last patent suggest the application of a variety of known statistical procedures for the comparison of the pattern of emitted pulses with the pattern of the received echo-pulses. For the direct pattern comparison, the reference pattern is obtained through a calibration measurement of "the distance of the reference measurement object from the measuring instrument being approximately zero". Statistical methods are naturally time and memory consuming with limited accuracy. In addition, the method of the discussed invention offers only one specific type of modulation with the duration of the time-shift interval greater then the relaxation time of the laser. It is important to admit that the type of modulation of the last patent does not protect against the accuracy reducing effect from the variety of passive disturbances existing in the medium (reflections from fixed targets).

The analysis of the prior art solutions leads to a conclusion that for the PTT monitoring the following techniques or combination of them are used:

Scalar or vectorial characteristic elements of the received echo-signal; the echo-signal exists in two major forms: (a) the form of a pattern of separate pulses—the emitting element relaxes before generating each next pulse; (b) the form of an echo-envelope—the emitting element generates the next pulse being still involved in the process of emitting the previous one Signal-to-Noise ratio improving modulation of the transmitted pulses including various versions of the pulse-code modulation In addition, one common property must be attributed to all prior art pulse transit time-based methods for distance measurement: none of these methods adapt to the environment; the echo-developing technique and echo-processing algorithms of the prior art do not reflect changes in the membership of the sets of passive and/or active disturbances. However, the transience of the environment where the distance measurement is being performed could seriously reduce the accuracy of the PTT and consequently the distance measurement.

Therefore, the object of the present invention is the improvement of the accuracy and the operational speed of pulse transit time-based methods for distance measurement regardless of the transmitted pulses' physical origin; the distance measurement is being carried out under the intensive influence of multiple passive and active disturbances that occur in the chaotically changing environment.

SUMMARY OF THE INVENTION

According to the present invention, an apparatus for distance measurement includes means for generating and sending a pattern of sent pulses toward a target, means for receiving a pattern of received pulses reflected at the target, and means for computing and controlling that receive, process, transfer, and exchange information between the parts of the apparatus and between the apparatus and the environment. Additionally, the apparatus for distance measurement includes means for modulating the sent pulses to minimize effect of disturbances during the measuring process. Furthermore, the apparatus may include means for evaluating observability of pulse transit time through analysis of patterns of sent and received pulses.

A method for distance measurement in accordance with the present invention includes the steps of setting initial components for a vector of parameters defining modulation of sent pulses; emitting a pattern of sent pulses toward a target according to the vector of parameters; receiving a pattern of received pulses reflected from the target; evaluating observability of pulse transit time through analysis of patterns of the sent and received pulses; obtaining a pulse transit time measurement through the analysis of the patterns of the sent and received pulses if the evaluation is satisfactory; calculating sought distance by taking the pulse transit time measurement as an input if the evaluation is satisfactory; performing a correction on the components of the vector of parameters of modulation of the sent pulses if the observability evaluation is not satisfactory; and returning to the emitting a pattern of modulated pulses step of the method, thereby providing an effective protection against disturbances that affect the process of measurement.

One major advantage of the present invention is that the apparatus and method according to the present invention provides an effective protection against disturbances that influence the process of measurement of various distances.

These and other objects, features, and advantages of the present invention will become apparent in light of the drawings and detailed description of the present invention provided below.

DETAILED DESCRIPTION OF THE INVENTION

The general idea of the present invention is that a complex, multi-component and adapting to changes in the environment and the measuring device itself modulation of the emitted pulses is the way to minimize the harmful impact from the disturbances on the accuracy of the distance measurement. The above-declared principle has an effect on the approach to establishing a correlation between the pattern of emitted pulses and the pattern of echo-pulses needed for further determination of the PTT. It follows from the prior art analysis that statistical techniques for comparison of the emitted and reflected pulse-patterns yield to the direct methods in the accuracy and speed of the PTT measurement. By the method of the present invention, the direct comparison of the pulse-patterns is implemented through creation of a vector v of characteristic variables derived from the specifics of modulation applied to the emitted pulses. These characteristic variables are the informative indicators that are used in the pattern comparing procedure. Suppose, $v_s$ denotes the informative vector for the sent pulses and $v_r$ denotes the informative vector for the received pulses. If the received pattern of pulses fully conforms to the sent pattern of pulses, then each component of the vector $v_s$ uniquely corresponds (functionally dependent on) with the respective component of the vector $v_r$ i.e., $$v_r \rightarrow v_s \qquad (1)$$

If the received pattern partially conforms to the sent pattern of pulses, then the statement (1) is not true and the number k (k-factor) of the functionally dependent coordinates in the relation $R=\{v_r, v_s\}$ is less than the length of the vector $v_s$. Therefore, the number k serves as an indicator of the trustworthiness of the pulse patterns analysis or the observability of the PTT-variable and, at the same time, as a measure of the efficiency of the emitted pulses modulation that is currently active in the measuring procedure. In that way, the process of the PTT determination acquires the property of adaptation.

Figure 1:
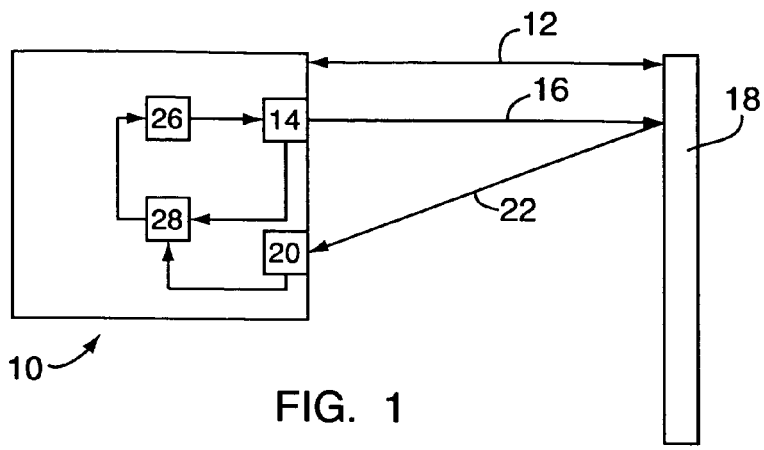
FIG. 1 is a schematic representation of a distance measuring apparatus, according to the PI.

Referring to FIG. 1, an apparatus 10 for measuring distance 12 includes means for generating and sending 14 a pattern of sent pulses 16 toward a target 18. The apparatus 10 also includes means for receiving 20 a pattern of received or reflective pulses 22 that are reflected at the target 18. The apparatus also includes means for modulating 26 the sent pulses 16 to minimize effect of disturbances during the measuring process. The apparatus may also include means for evaluating observability 28 of pulse transit time for analysis of patterns of the sent and received pulses. A more detailed description of a distance measuring apparatus will be provided below.

Figure 2:
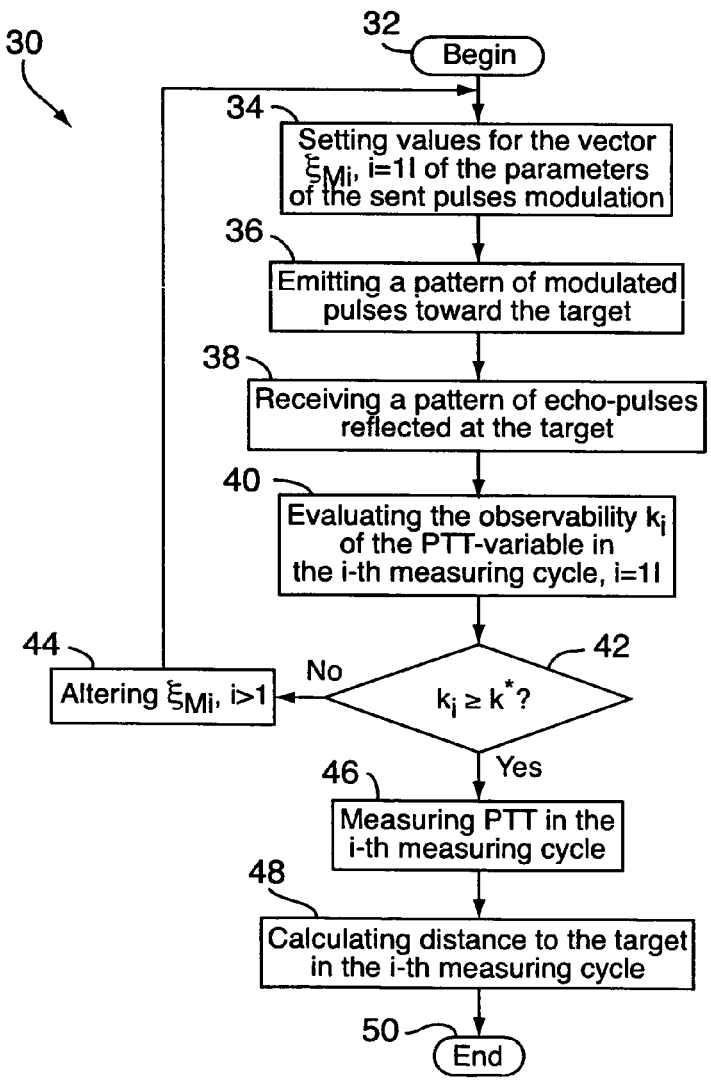
FIG. 2 is a flowchart of a sequence of operations according to a method of measurement according to the present invention.

Referring to FIG. 2, a method 30 for distance measurement is initiated by beginning the i-th measuring cycle, as indicated by numeral 32. Subsequently, the method is implemented by setting values for a vector $\xi_{Mi}$, $i=\overline{1,I}$, of parameters of sent pulses modulation, as indicated by numeral 34. A pattern of modulated pulses is then emitted toward the target, as indicated by numeral 36. A pattern of echo-pulses reflected at the target is then received, as indicated by numeral 38. Observability $k_1$ of the PTT-variable in the i-th measuring cycle $i=\overline{1,I}$; is subsequently evaluated, as indicated by numeral 40. The Observability $k_1$ with reference observability k* is then compared, as indicated by numeral 42. Altering the vector $\xi_{Mi}$, $i=\overline{1,I}$, of parameters of the sent pulses modulation is then performed, as indicated by numeral 44. PTT in the i-th measuring cycle is then measured, as indicated by numeral 46. The distance to the target in the i-th measuring cycle is subsequently calculated, as indicated by numeral 48, completing the i-th measuring cycle, indicated by numeral 50.

The above described method can be implemented by various embodiments, several of which are described below. The following sequences of operations provide more details about the method's various implementations.

Embodiment 1

$$\forall \xi_{Mi} \subset \Xi_M : \begin{cases} k_i \geq k^* \Rightarrow \xi_{Mi} = \xi_{Mi-1} \\ k_i < k^* \Rightarrow \xi_{Mi} = f_a(\xi_{Mi-1}, \Xi_M) \\ S_s(t, i) = M[\xi_{Mi}, t] \end{cases} \quad (2)$$

The following notation is used in the description of the Embodiment 1.

$\xi_{Mi}$—vector of parameters defining the type and the quantitative characteristics of the emitted pulses modulating procedure at the i-th step of the adaptive correction;

$f_a$—adaptive correcting vector-function responsible for altering the parameters of the modulating procedure;

$\Xi_M$—set of the pulse modulating procedure's substantial parameters;

$S_s(t,i)$—emitted pulse pattern, $M[\xi_{Mi}, t]$ denotes the modulating operator.

A reinforcement of the Embodiment 1 by adding the disturbance predictive capabilities makes possible further improvement of the dynamics of distance measurement:

Embodiment 2

$$\forall \xi_{Mi} \subset \Xi_M : \begin{cases} F(k_i \geq k^*) = \text{true} \Rightarrow \xi_{Mi} = \xi_{Mi-1} \\ F(k_i \geq k^*) = \text{false} \Rightarrow \xi_{Mi} = f_a(\xi_{Mi-1}, \Xi_M) \\ S_s(t, i) = M[\xi_{Mi}, t] \end{cases} \quad (3)$$

Here, $F(k_i \geq k^*)$ denotes a predicting procedure with the binary outcome "true" when the number k is forecasted to be greater then the threshold k* at the next i-th step of the adaptive correction. One possible embodiment of the Embodiment 1 and Embodiment 2 suggests that the adaptive correcting function is to be determined during the design phase of the measuring system implementation. Another embodiment of the method includes artificial intelligence methods for the k-factor prediction and the $f_a$—function continuous determination during the process of measurement, as described in U.S. Pat. No. 6,581,047, which is incorporated by reference herein.

Another adaptive implementation of the present invention uses the prediction of the beginning moments and the duration of periods the possible disturbances affecting the process of measurement in each measuring cycle. This algorithm is based on the notion that any substantial disturbance affects the pattern of received pulses. Hence, the disturbances occupy certain areas on this pattern. By using the Embodiment 1, the correspondence of the sent and received patterns is established. Consequently, each zone on the received pattern that the disturbance has occupied is localized. The next step is the application of the predicting procedure that forecasts which segment on the pattern will be occupied by the disturbance at the next measuring cycle. The final step of the discussed version of the method of the present invention requires blocking data collection from the part of the received pattern of pulses that have been predicted being corrupted. This approach is denoted Embodiment 3. By using Embodiment 3, it makes possible the acceleration of the process of measurement and the sophisticated use of statistical techniques for the determination of the PTT too. The flowchart of the sequences of operations by the method's Embodiment 3 is shown in the FIG. 3. Method 60 includes steps 62–68 as detailed in FIG. 3.

Figure 3:
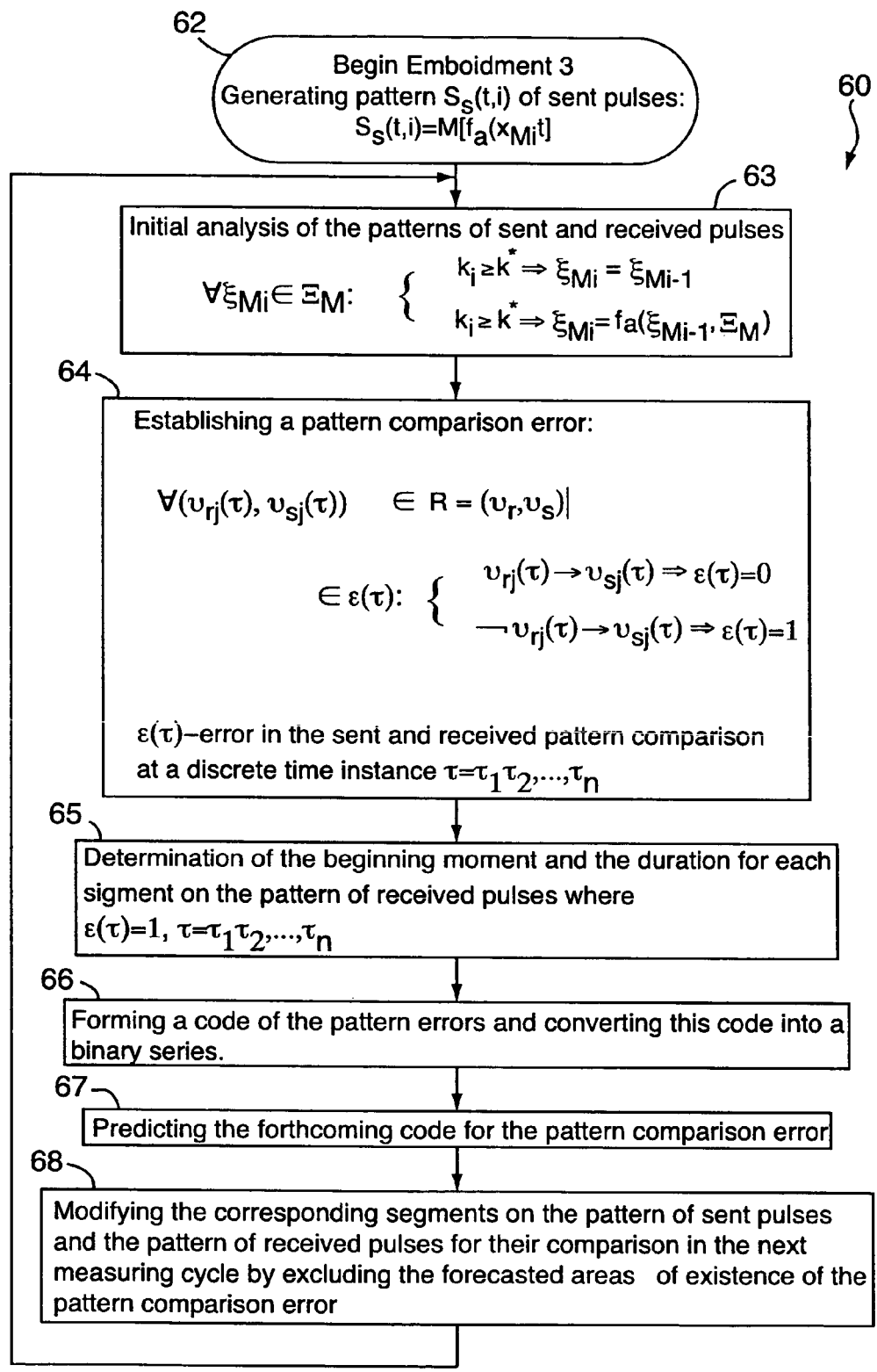
FIG. 3 is a flowchart of a sequence of operations of one embodiment of the method of measurement of the present invention of FIG. 2.
Figure 4:
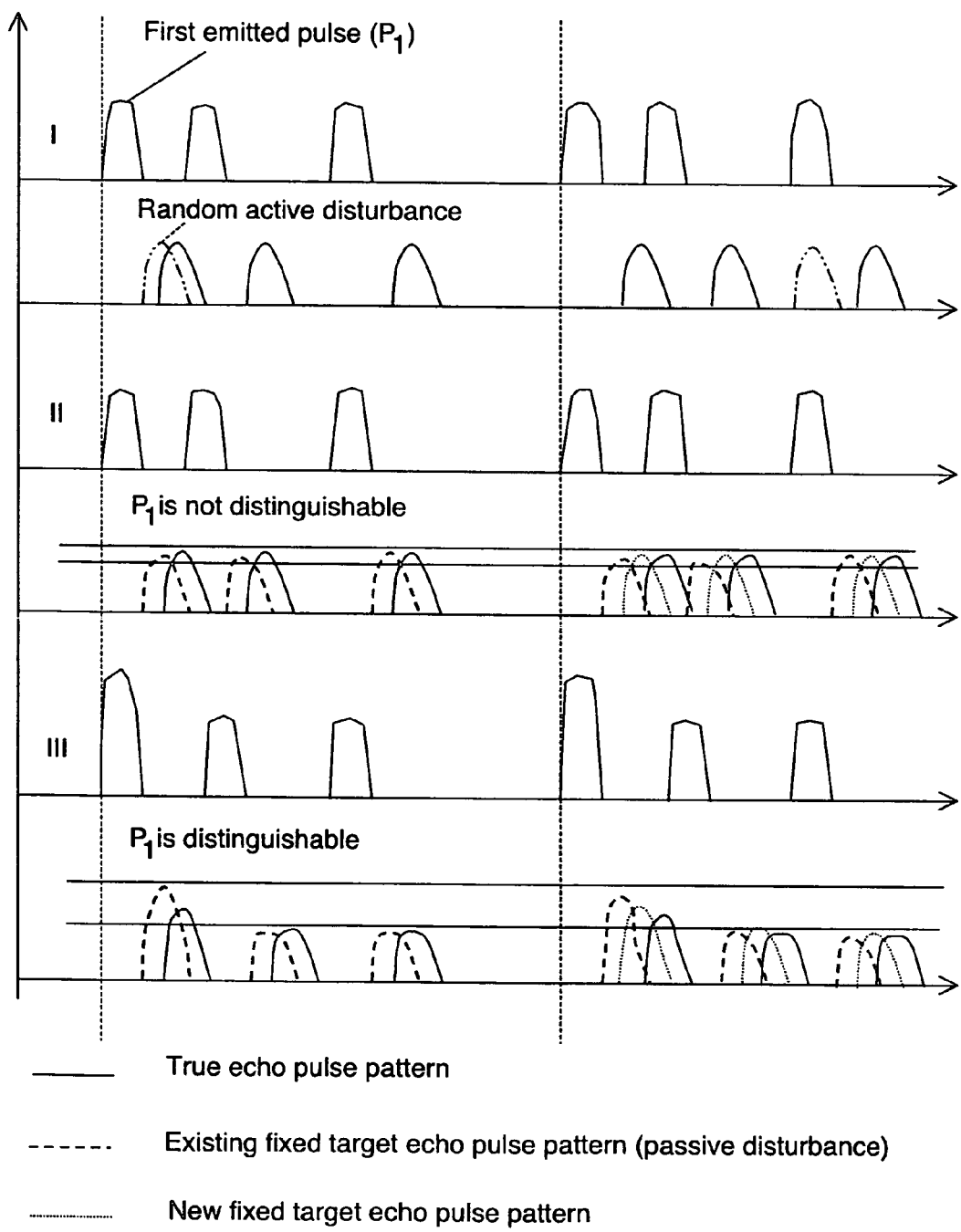
FIG. 4 is a diagram depicting an illustrative example of how a change in the environment could affect the accuracy of the PTT measurement.

The important element of the method of the present invention is the $f_a$—adaptive correcting vector-function that controls the parameters of the sent pulses modulation. The illustrative example of the level measuring application of the method demonstrates the importance of the adaptive correction to the accuracy of the PTT measurement. The example is presented in the FIG. 3. The diagram part I of the FIG. 4 shows that the code-modulated transmitted pulses are protected against random active disturbances. The part II of the diagram shows that the coding of the emitted pulses pattern is not effective when the disposition of the fixed targets (passive disturbances) changes unpredictably. The part III of the diagram demonstrates that the transition to the amplitude modulation of the emitted pulses pattern is effective in the cases when the disposition of the fixed targets changes unpredictably. According to the method's Embodiment 1, the adaptive correcting function $f_a$ for the given example is as follows:

$f_a$—tracking based on the FIG. 3 example

| # | $f_a$ - components: substantial parameters of the sent pulses modulation | Parameter Value |
|---|---|---|
| | Measuring Cycle I: k = 10 (1) | |
| 1 | # Sent pulses | 3 |
| 2 | Length of the first pulse | $L_1$ |
| 3 | Amplitude of the first pulse | $A_1$ |
| 4 | Duty factor of the first pulse | $DF_1$ |
| 5 | Length of the second pulse | $L_2$ |
| 6 | Amplitude of the second pulse | $A_2$ |

-continued

| $f_a$ - components: substantial parameters # of the sent pulses modulation | Parameter Value |
|---|---|
| 7 Duty factor of the second pulse | $DF_2$ |
| 8 Length of the third pulse | $L_3$ |
| 9 Amplitude of the third pulse | $A_3$ |
| 10 Duty factor of the third pulse | $DF_3$ |
| Measuring Cycle II: k = 3 (1) (Not necessarily followed by the Measuring Cycle I) | |
| 1 # Sent pulses | 3 |
| 2 Length of the first pulse | $L_1$ |
| 3 Amplitude of the first pulse | $A_1$ |
| 4 Duty factor of the first pulse | $DF_1$ |
| 5 Length of the second pulse | $L_2$ |
| 6 Amplitude of the second pulse | $A_2$ |
| 7 Duty factor of the second pulse | $DF_2$ |
| 8 Length of the third pulse | $L_3$ |
| 9 Amplitude of the third pulse | $A_3$ |
| 10 Duty factor of the third pulse | $DF_3$ |
| Measuring Cycle III: k = 10 (1) (Not necessarily followed by the Measuring Cycle II) | |
| 1 # Sent pulses | 3 |
| 2 Length of the first pulse | $L_1$ |
| 3 Amplitude of the first pulse | $g \cdot A_1, g > 1$ |
| 4 Duty factor of the first pulse | $DF_1$ |
| 5 Length of the second pulse | $L_2$ |
| 6 Amplitude of the second pulse | $A_2$ |
| 7 Duty factor of the second pulse | $DF_2$ |
| 8 Length of the third pulse | $L_3$ |
| 9 Amplitude of the third pulse | $A_3$ |
| 10 Duty factor of the third pulse | $DF_3$ |

The return to k=10 in the Measuring Cycle III became possible because the transition to the amplitude-code modulation of the sent pulses allowed involvement of the additional informative indicator—the true first pulse's amplitude had to have the minimal value among the all scanned gained amplitudes; the property of the level measurement. Therefore, in the given example, the adaptive measuring system responded to changes in the environment (increase in the number of reflections from spurious targets) and controlled the parameters of the modulation of the sent pulses (pulse-code modulation→amplitude-pulse-code modulation), whereby improving the accuracy of the PTT measurement.

According to the object of the present invention, the origin of the waveform and the type of the medium through which the pulses propagate are not relevant to the proposed method. Therefore, the method will be explained in detail primarily by the example of its acoustic application.

Figure 5:
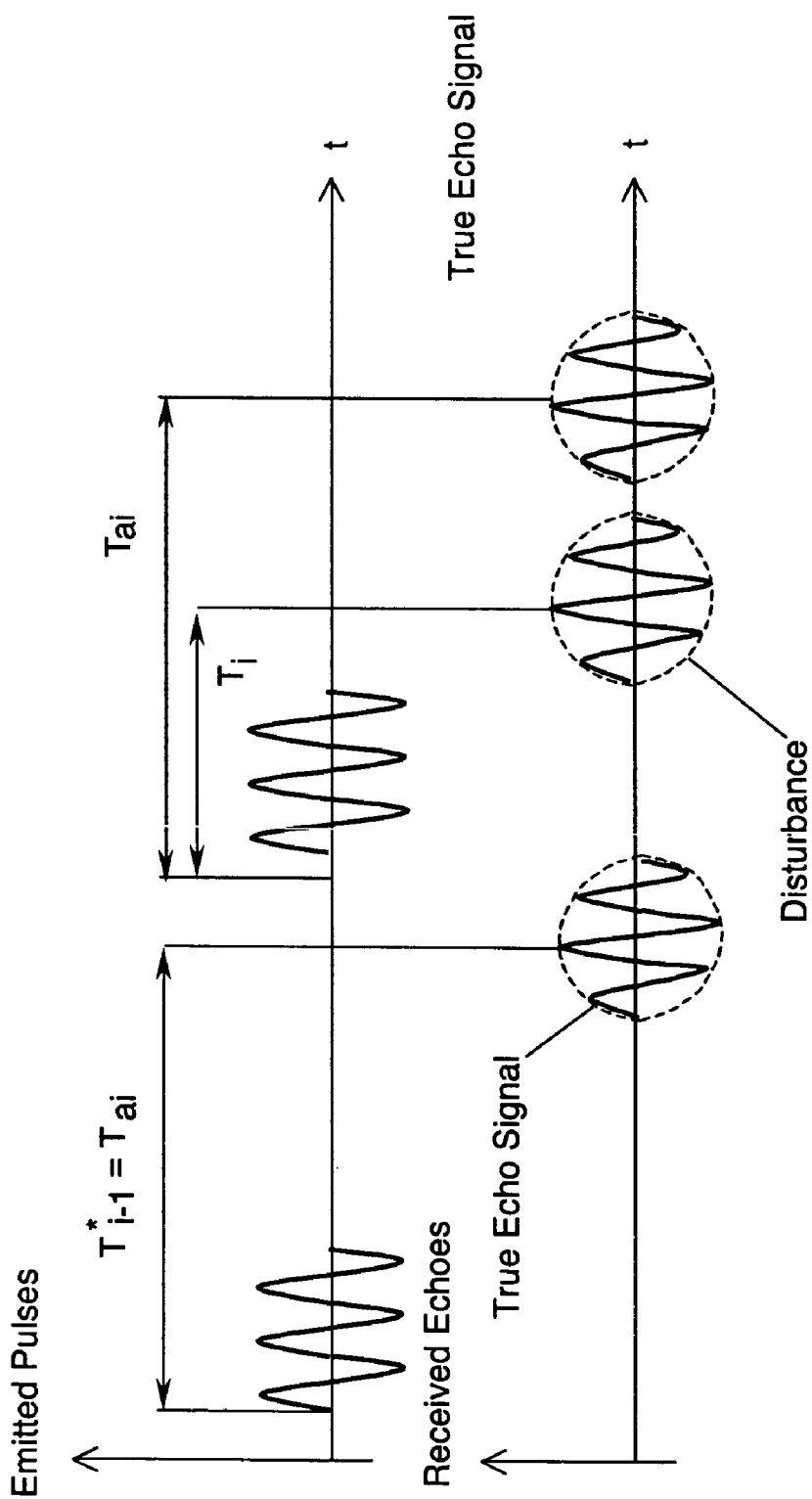
FIG. 5 is a diagram showing how the prior art methods erroneously calculate the PTT-variable ($T_i$) smaller than the PTT-variable's actual value ($T_{ai}$): $T_i < T_{ai}$.
Figure 6:
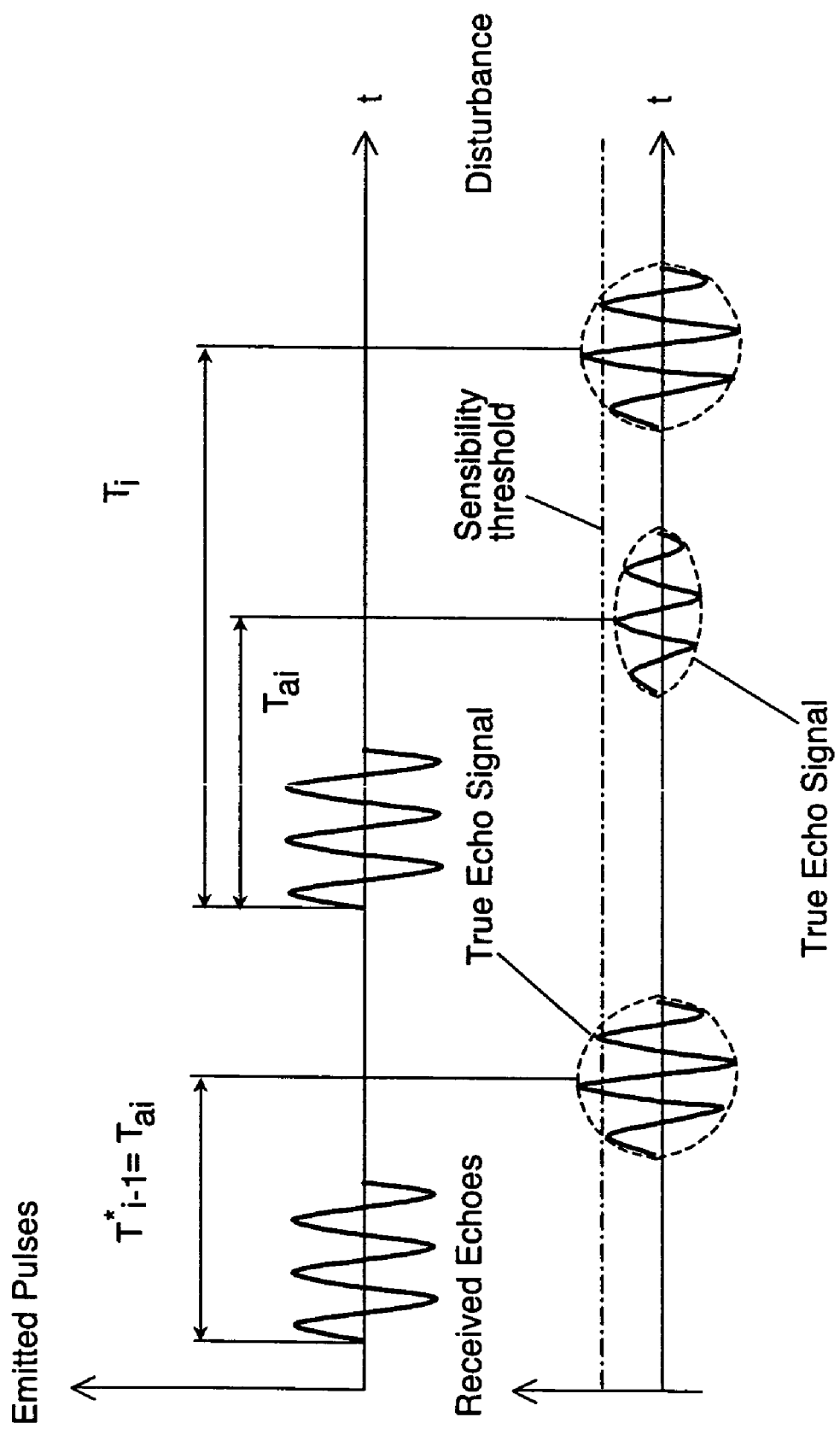
FIG. 6 is a diagram showings how the prior art methods erroneously calculate the PTT-variable ($T_i$) larger than the PTT-variable's actual value ($T_{ai}$): $T_i > T_{ai}$.
Figure 7:
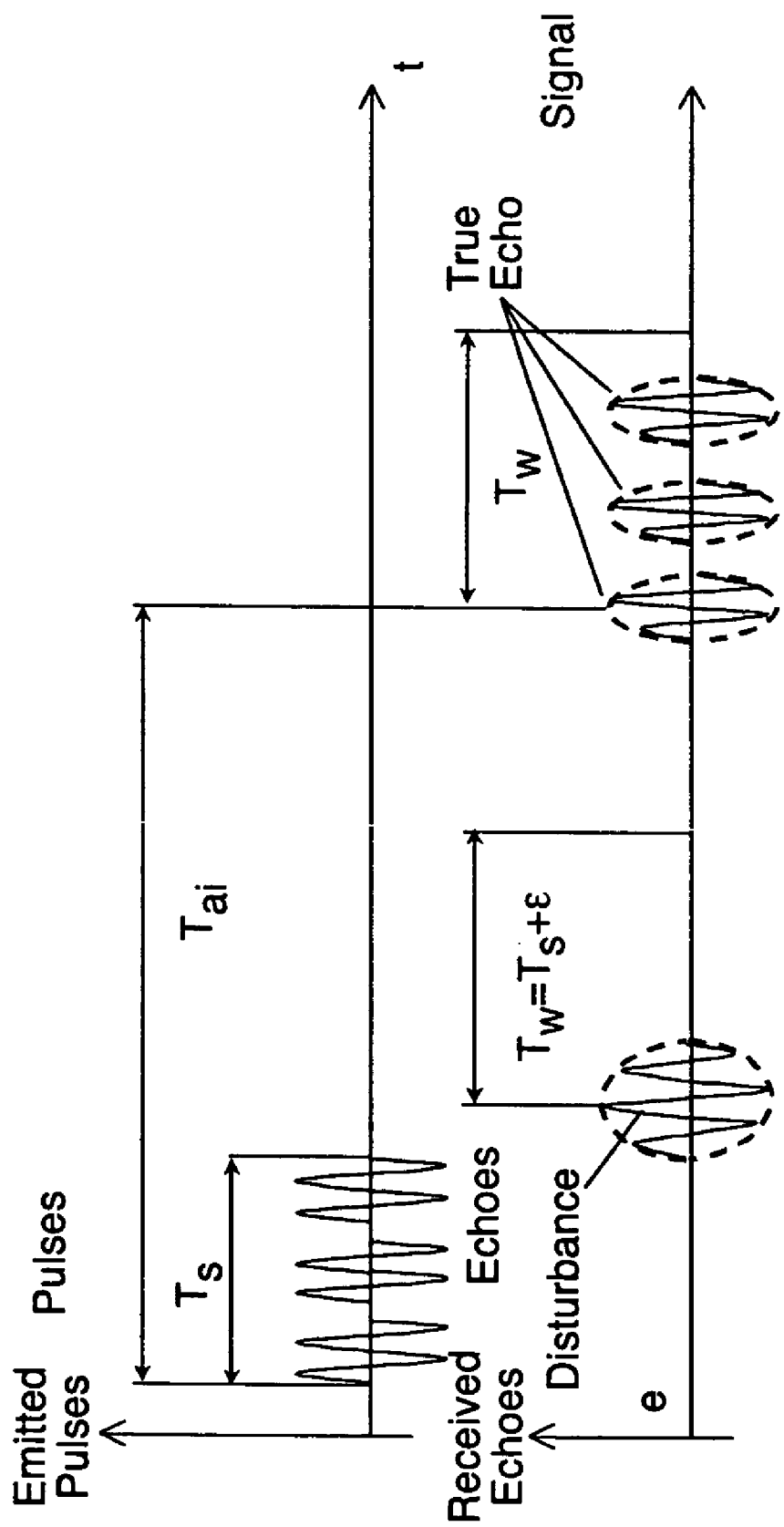
FIG. 7 is a diagram depicting the process of forming multiple echo envelopes providing for the interference protection in the method of the present invention.

By the method of the present invention, the base mechanism for the creation of the pattern of emitted acoustic pulses: $S_s(t,i)=M[\xi_{Mi},t]$, $i=\overline{1,I}$; i—measuring cycle number; is the pulse-code modulation. The transducer-emitted acoustic pulses are modulated into a pulse code such that the only certain combination of the returned bursts of echo pulses is considered the true sought distance-associated acoustic response. The time diagrams of the FIG. 5, FIG. 6 and FIG. 7, illustrate the advantages of the pulse-code modulation for acoustic applications. The FIG. 5 diagram shows how the prior art methods calculate the PTT, additionally denoted $T_i$, at the i-th measuring cycle. The prior art acoustic methods capture the first echo-signal that comes to the receiver in the measuring cycle. Naturally, the prior art acoustic methods do not distinguish the disturbance from the useful echo-signal. Hence, whenever the erroneous echo-signal is captured first, the sought distance still is being measured through the calculation of the time $T_i$. Therefore, having $T_i<T_{ai}$, makes the sought distance between the transducer and the target shorter than the actual distance, and having $T_i>T_{ai}$, makes the measured distance longer than the actual distance; $T_{ai}$—the actual PTT associated with the sought distance. The later might occur when the true echo-signal that comes first is weak—it does not exceed thresholds of the device's electronic input stages and the disturbance that comes after the true echo had been generated, is sufficiently strong—exceeds the electronic input stages' thresholds making the conventional measuring device erroneously take the disturbance as the useful echo-signal. This case is depicted by the FIG. 6.

The fact that the pulse-code modulation of the emitted pulses is used in the method of the present invention leads to the development of several disturbance-protected methods distinguishing the correct PTT measurement from the incorrect PTT measurement.

Embodiment 4

$$\forall t \in (t_i, t_{i+1}), i=\overline{1,I}: \begin{cases} n \geq m \Rightarrow \chi = 1 - \text{true measurement} \\ n < m \Rightarrow \chi = 0 - \text{false measurement} \end{cases} \quad (4)$$

Here, $t_i$, $t_{i+1}$ are the left and the right time-boundaries of the i-th measuring cycle;

$\chi$—Boolean indicator of the correctness of measurement; m—number of emitted acoustic pulse bursts; n—number of received echo pulse bursts.

Embodiment 5

$$\forall t \in (t_i, t_{i+1}): i=\overline{1,I}: (n=m) \& (T_w=T_s \pm \epsilon, \epsilon > 0) \rightarrow \chi = 1; \\ \text{otherwise } \chi = 0 \quad (5)$$

Here, $T_w$—sampling period starting at the instant of time the echo-signal is detected, and ending $T_s \pm \epsilon$, $\epsilon > 0$ time-units later; $T_s$—sent pulse-code time that includes the duration of the predetermined number of consequent acoustic bursts; $\epsilon$—time deviation associated with the inertia of the transducer and parametric drift in electronic stages of the measuring device. The time diagram reflecting the expressions (5) is shown on the FIG. 7.

Many distance measurement applications are the operating speed critical; typical for small distances measurement such as the flat material thickness measurement during its manufacturing. The increase of the method's operating speed requires reduction of the single pulse burst's emitting time ($T_p$) and shortening gaps between the bursts such that $$T_p = \Delta t_b + \Delta t_g < T_{DT} = f(T_T + T_H) \quad (6)$$

Figure 8:
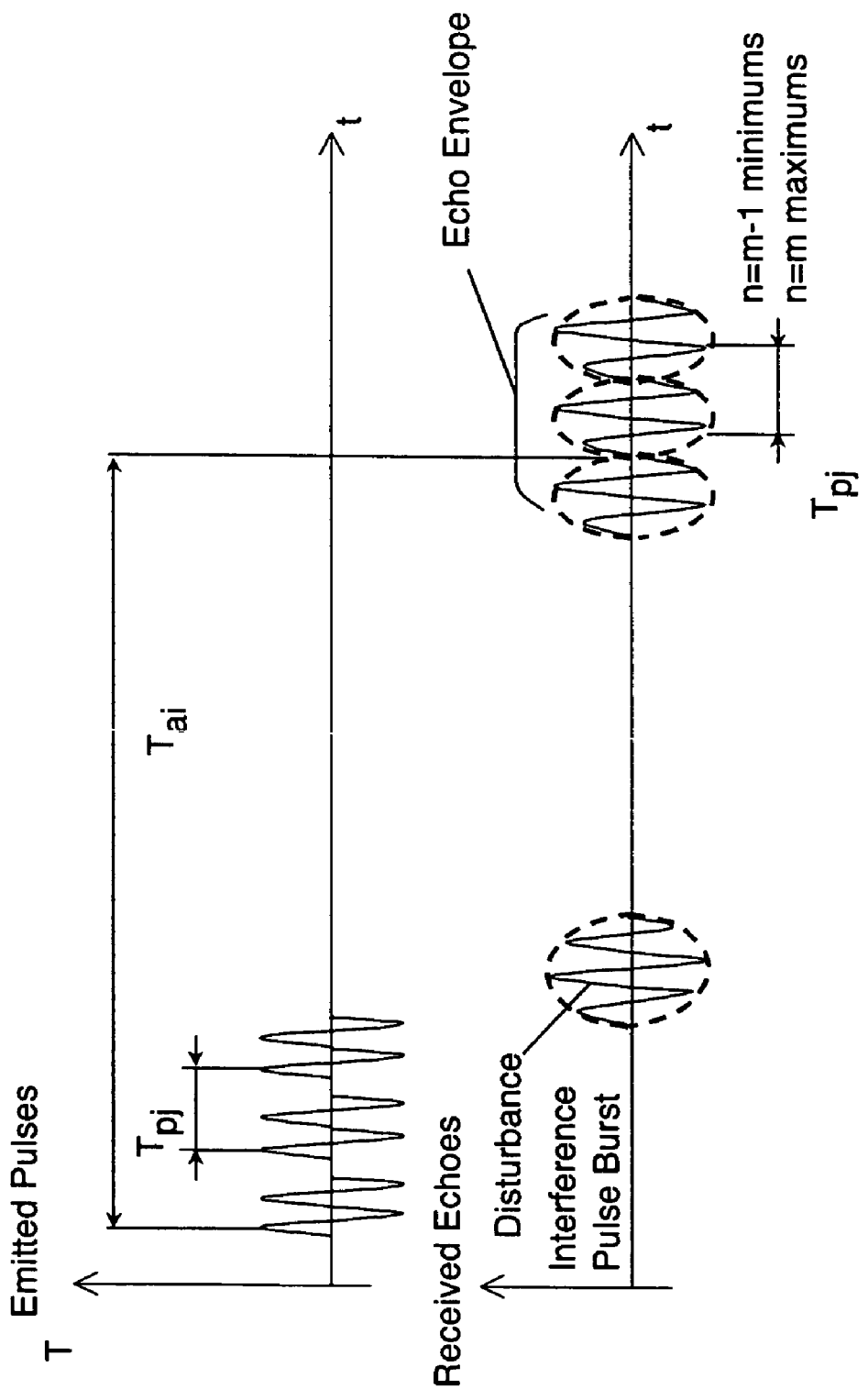
FIG. 8 is a diagram showings that by keeping the sum of the pulse burst duration and the gap between the consequent emitted pulse bursts smaller than the measuring device's transient time, the echo-pulses are "fused" together making a single continuous echo-envelope.

Here, $\Delta t_b$—single burst time; $\Delta t_g$—single gap time; $T_{DT}$—measuring device transient time; $T_T$—transducer time constant; $T_H$—electronic hardware time constant. The FIG. 8 diagram shows that due to (6), the received echo-pulses are "fused" together making a single echo envelope. In this case, the time distance between the envelope's consequent local maximums or local minimums is set by the period $\Delta t_b + \Delta t_g$ of the emitted pulse bursts. Hence, the expressions (5) transforms to Embodiment 6

$$\forall t \in (t_i, t_{i+1}), i=\overline{1,I}: (n_{ex}=\phi(m)) \& (t_{exi(j+1)}-t_{exi(j)} \\ =T_{Pj} \pm \epsilon_P, \epsilon_P > 0) \rightarrow \chi = 1; \text{ otherwise } \chi = 0 \quad (7)$$

$$\varphi(m) = \begin{cases} m, & \text{maximums included} \\ m-1, & \text{minimums included} \\ 2m-1, & \text{all extremums included} \end{cases}$$

Here, m—number of emitted pulse bursts; $n_{ex}$—number of minimums/maximums found on the time-length of the echo-envelope duration; $t_{exi\ (j)}$—timestamp for the j-th extremum on the echo-envelope of the i-th measuring cycle; $T_{pj}$—j-th acoustic pulse burst's duration in the emitted envelope of the i-th measuring cycle. The sought distance-associated time $T_{ai}$ could be linked to any extreme point on the echo envelope, e.g., to the first minimum as shown on the FIG. 8 diagram.

Figure 9:
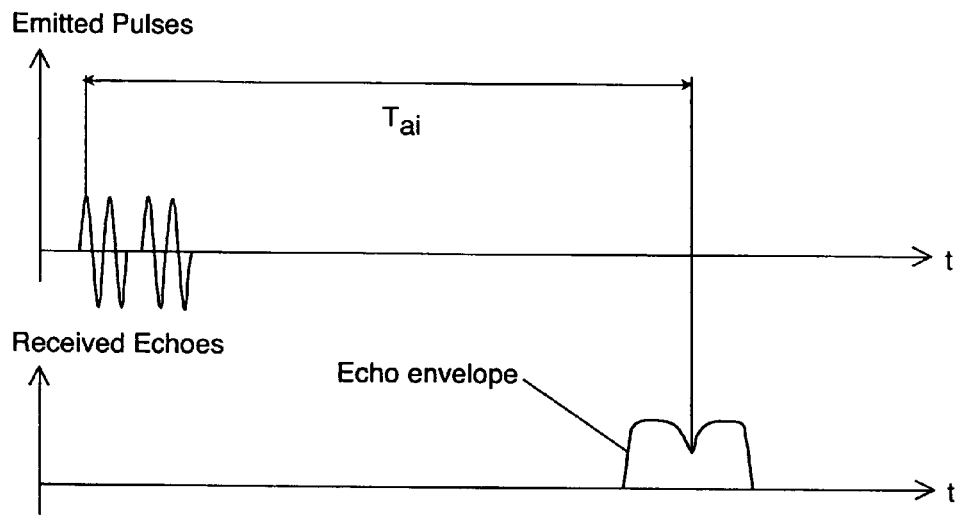
FIG. 9 is a diagram illustrating the advantage of using minimums of the echo-envelope for the interference-free distance measurement by the method of the present invention.

We found rewarding that the echo processing that is based on the Embodiment 6, includes only minimums of the received echo-envelope, because maximums of the echo-envelope vary in the broad range depending on the environment (temperature, humidity, turbulence and gas composition of the air). Such informative signal's fluctuation might cause saturation of the measuring device's input amplifier. Additionally, the envelope's maximums might span a few periods of the transducer's rest frequency due to the transducer's inertia. In both cases, the accuracy of measurement suffers. Therefore, for the precise measurement such as flow measurement or thickness measurement, the analysis of minimums is preferable. The time-diagram of the FIG. 9 illustrates the above made recommendations.

Figure 10:
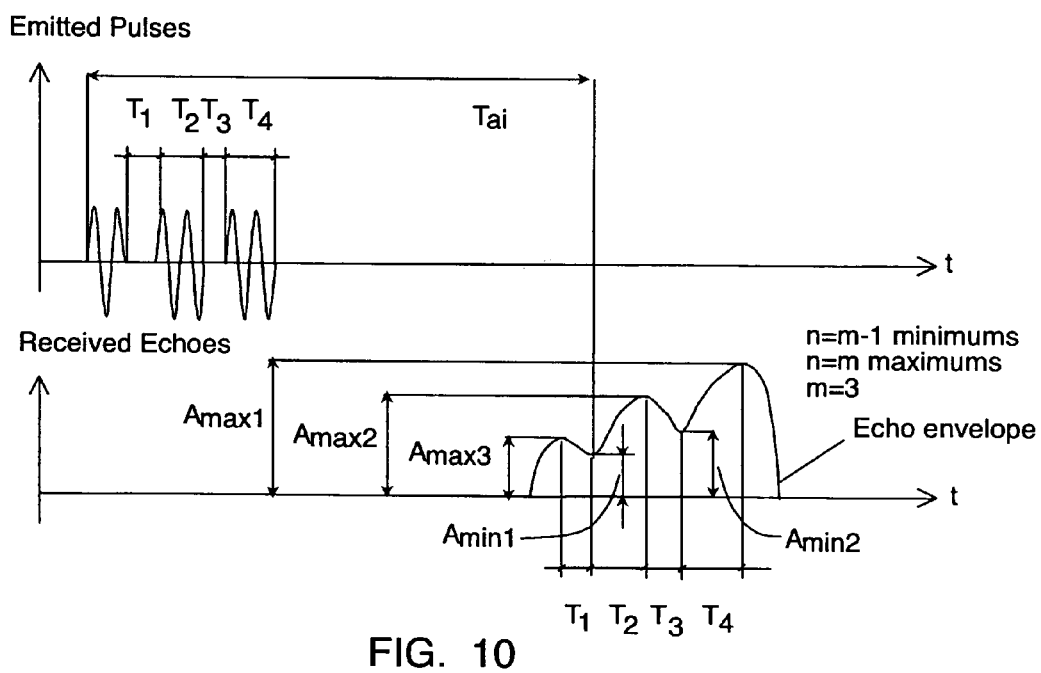
FIG. 10 is a diagram showing how the alteration of the number of emitted pulses in each or some of pulse bursts creates a continuous code-amplitude modulated echo-envelope that significantly increases the number of informative parameters for further interference protection during measurement and allows simultaneous use of more than one transducer in a single measuring device.

By altering the number of pulses in each pulse burst under the constraint (6), an amplitude-modulated echo-envelope could be obtained, thereby implementing the adaptive correcting vector-function $f_a(\xi_{Mi}, \Xi_M)$ of the method's Embodiment 1 and the subsequent embodiments of the method. The time-diagram illustrating the above-described idea of the controlled complex-modulated coding of the emitted pulses is shown in the FIG. 10. The application of the complex-modulated pulse coding creates the following additional advantages:

A single measuring device may include more than one measuring channel having a transducer that works at the same proper frequency because each measuring channel recognizes its own echo-signal by its unique signature Substantial improvement of the accuracy of measurement because the moment of capturing each local echo-envelope's minimum in the measuring cycle depends on the sought distance, pulse burst duration and the time gap between the pulse bursts, and it does not depend on the transducer's emitted wave length, echo pulses amplitude, measuring device's gain factor, and other parameters of the echo-processing With the acceptance of the controlled complex-modulated coding of the emitted pulses under the constraint (6), the analysis of the received echo-envelope becomes especially important for the PTT-variable observability evaluation and the PTT measurement. In this case, the informative variables (components of the vector $v_s$) of the pattern of sent pulses are present in the form of reference or specific numbers. This approach is particularly effective for the protection from passive disturbances existing in the acoustic medium, such as air turbulence or wind, local zones with heightened concentration of specific gases and/or vapor mist, and areas of increased temperature gradient. The method uses a relationship $v_r(\zeta)$, between the characteristic elements $\zeta = (\zeta_1, \zeta_2, \ldots \zeta_L)$ that exist on the echo-envelope, which shape is fully defined by the current vector of modulating parameters of the emitted pulses. One possible embodiment of the method suggests that $\zeta_1 = A_j^{max}/A_j^{min}$ is the ratio between the envelope's j-th local maximum $A_j^{max}$ and the adjacent local minimum $A_j^{min}$. Another embodiment of the method uses $\zeta_1 = A_j^{max}/A_{j \pm r}^{min}$, $r \in N$ as a component of the vector $\zeta$. The relationship $\mu_r(\zeta)$ is application-dependent. The disturbance-protective solution reflecting the above reasoning and including the adaptive control of the sent pulses modulation (2) is as follows:

Embodiment 7

$$\forall t \in (t_i, t_{i+1}), i = \overline{1,I}: (n_{ex} = \varphi(m)) \ \& \ (t_{exi\ (j+1)} - t_{exi\ (j)} = T_{pj} \pm \epsilon_p, \epsilon_p > 0) \ \& \ y_{ri}(\zeta) \subset [y_{ri}', y_{ri}''] = \chi(k_i)$$

$$y_{ri} \subseteq v_{ri}, \ y_{ri}' \subseteq v_{ri}', \ y_{ri}'' \subseteq v_{ri}''$$

$$|y_{ri}| = |y_{ri}'| = |y_{ri}''| = k_i,$$

$$k_i \geq k^* \rightarrow \chi(k_i) = 1; \text{ otherwise } \chi(k_i) = 0$$

$$|v_{ri}| = |v_{ri}'| = |v_{ri}''| \quad (8)$$

$$\forall \xi_{Mi} \subset \Xi_M : \begin{cases} k_i \geq k^* \Rightarrow \xi_{Mi} = \xi_{Mi-1} \\ k_i < k^* \Rightarrow \xi_{Mi} = f_a(\xi_{Mi-1}, \Xi_M) \\ S_s(t, i) = M[\xi_{Mi}, t] \end{cases} \quad (9)$$

The expression (9) of the Embodiment 7 is the one of many possible realizations of the adaptive control loop in the method. Depending on the application of the method, the sub-method (9) could be substituted with Embodiment 2 or Embodiment 3 of the method of the present invention or with any other possible implementation of the principle of adaptive control of the emitted pulses modulation.

Figure 11:
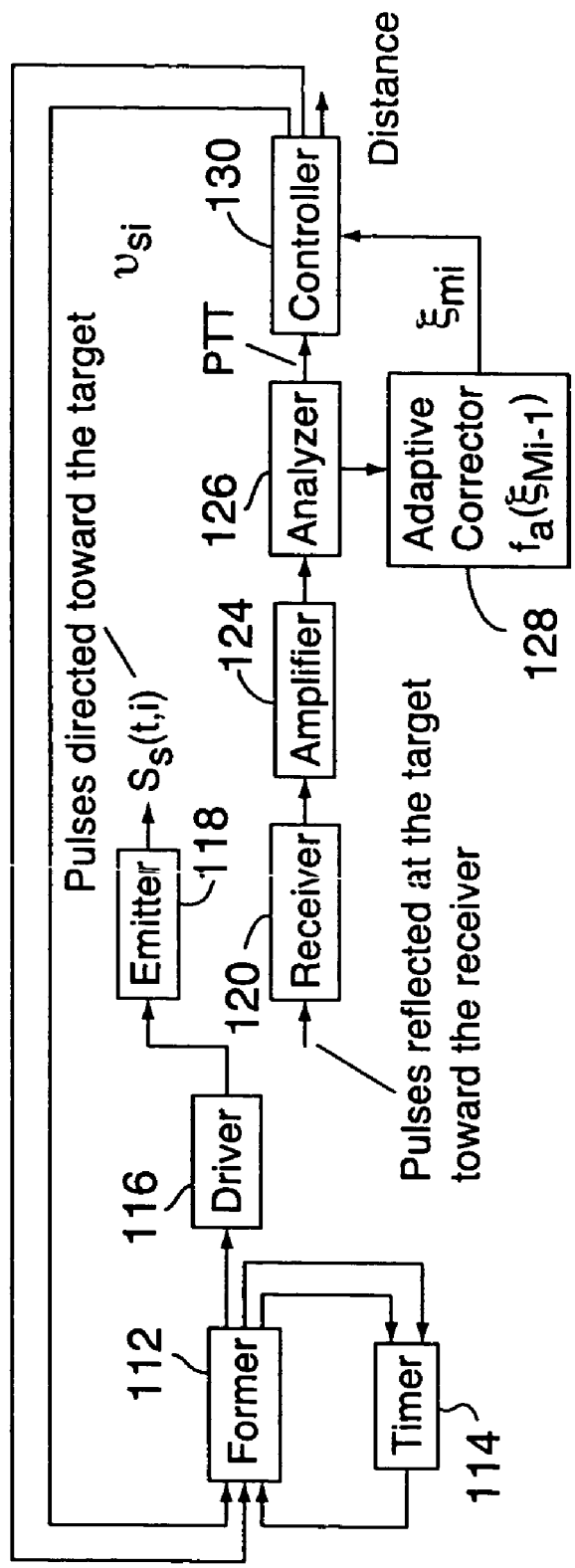
FIG. 11 is a functional block diagram of one embodiment of the device implementing the proposed method for distance measurement in accordance with the present invention.

One embodiment of a distance-measuring device 110 is shown in the FIG. 11. The device 110 includes a Former 112; Timer 114; a Driver 116; an Emitter 118, a Receiver 120; an Amplifier 124; an Analyzer 126; an Adaptive Corrector 128, implementing the function $f_a(\xi_{Mi-1})$; and a Controller 130.

The first output of the Controller 130 is connected to the first input of Former 112. The second output of Controller 130 is connected to the second input of Former 112. The third output of controller 130 is the measured distance, which is a global output of the device of the present invention. Controller performs two major tasks:

1. Controls the parameters of modulation of the emitted pulses such as amplitude, duration and duty factor;
2. Calculates the measured distance based on the PTT measurement.

The first output of Former 112 is connected to Driver 116. The second output of Former 112 is connected to the first input of Timer 114. The third output of Former 112 is connected to the second input of Timer 114. The output of Timer 114 is connected to the third input of Former 112. Former converts the Controller's vector of the pulse-modulation driving signals into the Drive's control output signals. Timer 114 supports the timing of the excitatory signal pulsation. The Drive's output is connected to Emitter 118. Driver 116 provides an excitatory signal to Emitter 118. Emitter sends pulses of waveforms toward the target. The output of Receiver 120 is connected to the input of Amplifier 124. Receiver 120 receives pulses of waveforms reflected at the target and sends the corresponding electrical signal to Amplifier 124. The output of Amplifier is connected to the input of Analyzer 126. The first output of Analyzer is connected to the first input of Controller 130. The second output of Analyzer is connected to Adaptive Corrector 128. The output of Adaptive Corrector 128 is connected to the second input of Controller. Amplifier amplifies and filters the receiver's output for further analysis by Analyzer. Analyzer 126 performs three major tasks.:

1. Creates a relation $R\{v_r, v_s\}$ of characteristic values derived from the sent and received patterns of pulses;
2. Compares the patterns and identifies the true PTT measurement;
3. Evaluates the observability $k_i$ of the PTT-variable.

Adaptive Corrector 128 implements the adaptive correction $f_a(\xi_{Mi-1})$ of the emitted pulses based on the evaluated observability of the PTT-variable.

The method of operation of the device of the present invention is as follows.

Controller 130 sets the initial vector $\xi_{M1}$ of the parameters of modulation and sends this vector-signal to Former 112. Former 112, having the Timer 114 in its local feedback loop, converts the vector of pulse-modulation driving signals received from Controller into a stimulus that Driver 116 transforms into an excitatory signal at the input of Emitter 118. On its turn, Emitter generates a series of pulses $S_s(t,i)$, $i=\overline{1,I}$ that form an initial pattern of the emitted pulses. These pulses propagate through an application-dependent medium toward the target. Then, being reflected at the target, the sent pulses redirect toward Receiver and become a pattern of the received pulses at the Receiver's output. The echo-pulses from Receiver are stored by Analyzer after their pre-Amplification by amplifier. Analyzer, Controller and Adaptive Corrector either could be implemented in the form of software modules of the device or could be comprised of the device's hardware units. In any case, Analyzer 24:

1. Creates a relation $R\{v_r, v_s\}$ of characteristic values derived from the sent and received patterns of pulses;
2. Compares the patterns and identifies the true PTT measurement; the PTT digital representation goes to Controller 26 for the sought distance calculation—the global output of the device;
3. Evaluates the observability of the PTT-variable and provides Adaptive Corrector 24 with the variable $k_i$—the measure of the PTT-variable observability at the i-th measuring cycle.

The set $\Xi_M$ of the parameters of modulation is stored in the Adaptive Corrector 24 and the vector $\xi_{Mi}=f_a(\xi_{Mi-1}, \Xi_M)\subset\Xi_M$ is the output of this corrector that goes to Controller 26 for further altering the modulation of the sent pulses in the next measuring cycle:

$$\forall \xi_{Mi} \subset \Xi_M : \begin{cases} k_i \geq k^* \Rightarrow \xi_{Mi} = \xi_{Mi-1} & \text{From} \\ k_i < k^* \Rightarrow \xi_{Mi} = f_a(\xi_{Mi-1}, \Xi_M) & \text{Adaptive Corrector} \\ S_s(t, i) = M[\xi_{Mi}, t] & \text{From Emitter} \end{cases}$$

Thus, the device performs an adaptive control to the pattern of emitted pulses 1, whereby protecting the distance measurement against various passive and active disturbances affecting the accuracy of the measurement; the alteration of the parameters of modulation might not occur at each next measuring cycle.

Although this invention has been shown and described with respect to the detailed embodiments thereof, it will be understood by those skilled in the art that various changes in form and detail thereof may be made without departing from the spirit and scope of the invention.

The invention claimed is:

1. A method for distance measurement comprising the steps of:
   setting initial components for a vector of parameters defining modulation of sent pulses;
   emitting a pattern of said sent pulses toward a target according to said vector of parameters;
   receiving a pattern of received pulses reflected from the target;
   evaluating observability of pulse transit time through analysis of patterns of said sent and received pulses;
   obtaining a pulse transit time measurement through the analysis of said patterns of said sent and received pulses if said observability evaluation is satisfactory;
   calculating sought distance by taking said pulse transit time measurement as an input if said observability evaluation is satisfactory;
   performing a correction on the components of said vector of parameters of modulation of said sent pulses if said observability evaluation is not satisfactory; and
   returning to said emitting a pattern of modulated pulses step of said method, thereby providing an effective protection against disturbances that affect the process of measurement;
   wherein said distance measurement is based on pulse transit time.

2. A method as claimed in claim 1 wherein:
   said vector of parameters of said sent pulses' modulation controls the process of modulation such that any kind of modulation of sent pulses is available including but not limited to pulse-coding with a variable duty factor and/or duration of pulses, amplitude, frequency or phase modulation or any possible combination thereof; and
   said modulation of said sent pulses produces specific areas on said pattern of received pulses such that a retrieval of said pattern of received pulses' characteristic variables tat are functionally relating to said pulse transit lime becomes possible under exposure to any passive and/or active disturbances existing in a measuring cycle; and
   the physical origin of said pulses is application-dependent including but not limited to acoustic, electromagnetic and light waveforms; and
   said pattern of sent pulses is a sequence of pulse bursts; and
   the minimal number of the pulse bursts in said sent pulses is equal to one; and
   the maximal number of the pulse bursts in said sent pulse could be a predetermined number or could be set in each or in some measuring cycles according to said vector of parameters of sent pulses; and
   the minimal number of pulses in said pulse burst is one and;
   The maximal number of pulses in said pulse burst could be a predetermined number or could be set in each or in some measuring cycles according to said vector of modulating parameters of sent pulses.

3. The method as claimed in claim 1 having said pulse transit time observability evaluate& further including:
   forming a first vector of characteristic variables that are associated with said pattern of sent pulses and defined by current values of said vector of parameters of sent pulses;
   forming a second vector of said characteristic variables that are associated with said pattern of received pulses and defined by current values of said vector of parameters of sent pulses;

creating a relation of characteristic variables that are the components of said first and said second vectors of characteristic variables;

evaluating the observability of said pulse transit lime through the analysis of functional dependencies in said relation;

generating an indicator variable showing if said pulse transit time observability is satisfactory or not satisfactory.

4. The method as claimed in claim 3 wherein:

said indicator of pulse transit time observability is equal to the number of functionally dependent pairs in said relation of characteristic variables that are derived from said patterns of sent and received pulses and are presented as the components of said first and second vectors.

5. The method as claimed in claim 3, further including:

evaluating said pulse transit time observability by comparing said indicator of transit time observability with a positive reference value such that if said indicator of observability is greater or equal to said reference value, then said pulse transit time observability is considered satisfactory; otherwise, said observability is considered unsatisfactory.

6. The method as claimed in claim 5, having evaluated said observability of said pulse transit time at the current measuring cycle, further including:

predicting the direction of change in the forthcoming value of said observability indicator with respect to said observability indicator's reference value such that if said indicator of observability is predicted greater or equal to said reference value, then said pulse transit time observability is considered satisfactory in the next measuring cycle; otherwise, said observability is considered unsatisfactory in the next measuring cycle.

7. The method as claimed in claim 1 wherein:

said pulse transit time observability evaluation may include non-forecasting techniques or forecasting techniques or combination of both forecasting and non-forecasting techniques depending on the specifics of said method's application.

8. The method as claimed in claim 1 having said pulse transit time measured, further including:

measuring said pulse transit time in each measuring cycle by capturing a time-position of one or more than one characteristic variables that are derived from said patterns of pulses if said pulse transit time observability is satisfactory.

9. The method as claimed in claim 8 wherein:

said characteristic variables of the patterns of sent and received pulses may include but not limited to the components of said first and said second vectors of characteristic variables and;

said characteristic variables of the patterns of sent and received pulses possess the property of low sensibility to disturbances affecting the process of measurement.

10. The method as claimed in claim 9 wherein:

utilizing the frequency modulation of said emitted pulses, said first vector of characteristic variables includes among the coordinates of said vector a timestamp associated with the time instance when the carrier frequency changes and;

said second vector of characteristic variables includes among the coordinates of said vector a timestamp associated with the time instance when the carrier frequency changes.

11. The method as claimed in claim 8, further including:

determining in the current measuring cycle the segments on said pattern of received pulses that are affected by disturbances;

predicting for the next measuring cycle the position of the disturbed segments on said pattern of received pulses;

blocking in the next measuring cycle the pulse transit time data collection from those segments on said pattern of received pulses that have been predicted being disturbed in the next measuring cycle.

12. A method as claimed in claim 1 wherein:

said pulse transit time measurement may include non-forecasting techniques or forecasting techniques or combination of both forecasting and non-forecasting techniques depending on the specifies of said method's application.

13. The method as claimed in claim 1 wherein:

the true pulse transit time measurement is distinguished from the false pulse transit dine measurement by requiring tat in any measuring cycle the number of emitted pulse bursts must be greater or equal to the number of received echo pulse bursts or;

the true pulse transit time measurement is distinguished from the false pulse transit time measurement by requiting that in any measuring cycle the number of emitted pulse bursts is equal to the number of received echo pulse bursts and the sampling time for collecting the echo-pulse bursts is in the neighborhood of the sent pulse-code time that includes the predetermined number of consequent pulse bursts.

14. The method as claimed in claim 1 wherein:

the single pulse-bunt's duration and the single pulse burst's duty factor are as such that a fusion of separate echo-pulses occurs producing a single, continuous within its duration, pattern and;

the true pulse transit time measurement is distinguished from the false pulse transit time measurement by requiring that in any measuring cycle the number of extreme values present on said echo pattern's envelope is in a relation to said number of pulse bursts existing in said pattern of sent pulses and;

the time distance between the two consequent likewise extreme values existing on said pattern of received pulses is within a neighborhood of the period of the corresponding pulse burst on said pattern of sent pulses.

15. The method as claimed in claim 14, wherein:

said fused continuous on its period echo-pattern is achieved by requiring that said single pulse's period and a gap between the two consequent pulses are smaller than the sum of a pulse emitting unit transient time and a processing hardware transient time or;

said fused continuous on its period echo-pattern is achieved by requiring that said single pulse burst's period and a gap between the two consequent pulse bursts are smaller than the sum of a pulse emitting unit transient time and a processing hardware transient time.

16. The method as claimed in claim 14, wherein:

for said pulse transit time observability evaluation, a set of characteristic variables of said pattern of received pulses is established and;

said set includes in its membership but not limited to (a) maximums and minimums existing on said pattern, (b) relationship between at least one of said pattern's extreme value and one of its opposite extreme value, (c) relationship between at least one of said pattern's extreme value and its another likewise extreme value and;

said characteristic variables could be comprised of adjacent extreme values existing on said pattern of received pulses or could be comprised of extreme values that are not adjacent in their position on said pattern of received pulses.

17. The method as claimed in claim 14, wherein:

a value of at least one minimum of said pattern of received pulses is used for distinguishing said true pulse transit time measurement from said false pulse transit time measurements, whereby providing protection against possible saturation of said pattern of echo pulses.

18. The method as claimed in claim 1, having performed said correction on the parameters of sent pulses modulation, further including:

altering at least one component of said vector of parameters of modulation such that said pattern of sent pulses in some forthcoming measuring cycle differs from said pattern of sent pubes existing in the current measuring cycle.

19. An apparatus for distance measurement comprising:

means for generating and sending a pattern of sent pulses toward a target;

means for receiving a pattern of received pulses reflected at the target;

means for computing and controlling that receive, process, transfer and exchange information between the parts of said apparatus and between said apparatus and the environment; and means for modulating said sent pulses to minimize the effect of disturbances during a distance measuring process;

wherein said distance measuring process is based on pulse transit time.

20. The apparatus as claimed in claim 19, wherein:

said computing means include a plurality of hardware and software elements meant for the implementation of functions of analyzing the process of distance measurement altering said sent pulses modulation and controlling the process of distance measurement in accordance with said method for distance measurement and;

said function of analyzing the process of distance measurement is attributed to Analyzer-unit of said computing means and;

said function of altering said sent pulses modulation is attributed to Corrector-unit of said computing means and;

said function of controlling the process of distance measurement in accordance with said method for distance measurement is attributed to Controller-unit of said computing means.

21. The apparatus as claimed in claim 20, wherein:

said means for generating and sending said pattern of pulses are comprised of a plurality of functional elements including Former, Timer, Driver and Emitter, and;

Former, whose enable input is connected to said Controller's initiating output, and whose digital input bus is connected to said Controller's digital output bus, and whose control output bus is connected to the driving point bus of said Driver, converts said Controller's vector of pulse modulating driving signals into said Driver's control output bus and;

Timer, whose enable input is connected to said Former's synchronizing output and whose output is connected to said Former's complementing input supports the liming of said Driver's control signal initiation and;

Driver, whose output is connected to the excitatory input of said Emitter, being controlled by said Former, provides an excitatory signal to Emitter and;

Emitter emits said pattern of pulses toward said target.

22. The apparatus as claimed in claim 21, wherein:

said means for receiving said pattern of pulses reflected at the target are comprised of a plurality of functional elements including Receiver and Amplifier, and;

Receiver receives said pattern of echo pulses and sends said pattern of echo pulses for an amplification through said Receiver's output connected to the input of said Amplifier and;

Amplifier whose output is connected to the analog input of the Analyzer unit of said computing and controlling means, provides initial echo-signal processing that includes at least the amplification of said pattern of received pulses.

23. The apparatus as claimed in claim 22, wherein:

said Analyzer whose analog input is connected to said output of Amplifier, performs computing operations that include but not limited to (a) creating a relation of characteristic values derived front said patterns of send and received pulses; (b) comparing pairs of variables in said relation and identifying the true pulse transit time measurement (c) evaluating said observability of said pulse transit lime variable and;

said Corrector whose digital input bus is connected to Analyzer's digital output bus and whose digital output bus is connected to Controller's digital input bus, performs computing operations that include but not limited to calculating corrections of said emitted pulses modulating parameters based on the result of said pulse transit time observability evaluation provided by Analyzer, and generating a vector of parameters that identity the modulation of said emitted pulses, and delivering said vector of modulating parameters to Controller through said Corrector's output digital bus and;

said Controller whose digital input bus receives said vector of corrected modulating parameters from said Corrector that sends said enabling signal to said Former and whose digital output bus sends to said Former said vector of driving signals with a mask of said modulating parameters and whose global output contains the sought distance performs computing operations that include but not limited to generating said vector of driving signals controlling said sent pukes modulation, calculating said sought distance based on said pulse transit time measurement and interfacing the measured distance out for further utilization.

24. The apparatus as claimed in claim 19, wherein:

any digital input bus or digital output bus allows its hardware or software or combined hardware and software implementation and;

said bus represents a functionality of vectorial data communication within said computing and controlling means and other functional units of said apparatus.

25. An apparatus for distance measurement comprising:

means for generating and sending a pattern of sent pulses toward a target;

means for receiving a pattern of received pulses reflected at the target;

means for computing and controlling that receive, process, transfer and exchange information between the parts of said apparatus and between said apparatus and the environment; and means for evaluating observability of pulse transit time through analysis of patterns of said sent and received pulses;

wherein said apparatus measures distance based on pulse transit time.

* * * * *

UNITED STATES PATENT AND TRADEMARK OFFICE
CERTIFICATE OF CORRECTION

PATENT NO. : 7,103,500 B2
APPLICATION NO. : 10/776763
DATED : September 5, 2006
INVENTOR(S) : David I. Freger et al.

It is certified that error appears in the above-identified patent and that said Letters Patent is hereby corrected as shown below:

Column 14, line 59, please delete the word "evaluate &" and replace it with --evaluated--.
Column 16, line 19, please delete the word "dine" and replace it with --time--.
Column 16, line 20, please delete the word "tat" and replace it with --that--.
Column 16, line 25, please delete the word "requiting" and replace it with --requiring--.
Column 17, line 16, please delete the word "pubes" and replace it with --pulses--.
Column 18, line 18, please delete the word "front" and replace it with --from--.
Column 18, line 22, please delete the word "lime" and replace it with --time--.
Column 18, line 30-31, please delete the word "identity" and replace it with --identify--.
Column 18, line 43, please delete the word "pukes" and replace it with --pulses--.

Signed and Sealed this

Twenty-first Day of October, 2008

JON W. DUDAS
*Director of the United States Patent and Trademark Office*